(12) United States Patent
Moon (10) Patent No.: US 6,567,391 B1
(45) Date of Patent: May 20, 2003

(54) DEVICE AND METHOD FOR COMMUNICATING REVERSE PILOT SIGNAL IN MOBILE COMMUNICATION SYSTEM

(75) Inventor: Hi-Chan Moon, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/390,307

(22) Filed: Sep. 3, 1999

(30) Foreign Application Priority Data

Sep. 3, 1998 (KR) .............................................. 98-36680

(51) Int. Cl.$^7$ ................................................ H04J 11/00
(52) U.S. Cl. ........................ 370/342; 370/335; 370/527
(58) Field of Search ................................ 370/335, 342, 370/441, 527, 529; 375/140, 142, 146, 147, 149, 150; 455/522, 127, 561

(56) References Cited

U.S. PATENT DOCUMENTS 5,933,781 A * 8/1999 Willenegger et al. ....... 455/522
6,137,788 A * 10/2000 Sawahashi et al. ......... 370/342
6,304,563 B1 * 10/2001 Blessent et al. ............ 370/335
6,396,804 B2 * 5/2002 Odenwalder ................ 370/209

* cited by examiner

Primary Examiner—Lester G. Kincaid
(74) Attorney, Agent, or Firm—Dilworth & Barrese, LLP (57) ABSTRACT

A mobile station transmits a pilot signal, a common channel signal and a traffic channel signal for a reverse link. The mobile station normally transmits the common channel signal and the pilot signal at a predetermined transmission power, and transmits the pilot signal at a transmission power higher than the predetermined transmission power over a predetermined duration. The pilot signal transmitted over the predetermined duration is spread with a first spreading code over the duration where the pilot signal is transmitted at the predetermined transmission power, and is spread with a second spreading code over the duration where the pilot signal is transmitted at the transmission power higher than the predetermined transmission power.

16 Claims, 9 Drawing Sheets

TRAFFIC CH

PILOT CH

FIG.1

(PRIOR ART)

DEVICE AND METHOD FOR COMMUNICATING REVERSE PILOT SIGNAL IN MOBILE COMMUNICATION SYSTEM

BACKGROUND OF THE INVENTION

1. Field of the Invention

The present invention relates generally to a signal detecting device and method for a CDMA communication system, and in particular, to a device and method for acquiring a signal on a reverse link to perform multipath detection and finger assignment.

2. Description of the Related Art

Figure 1:
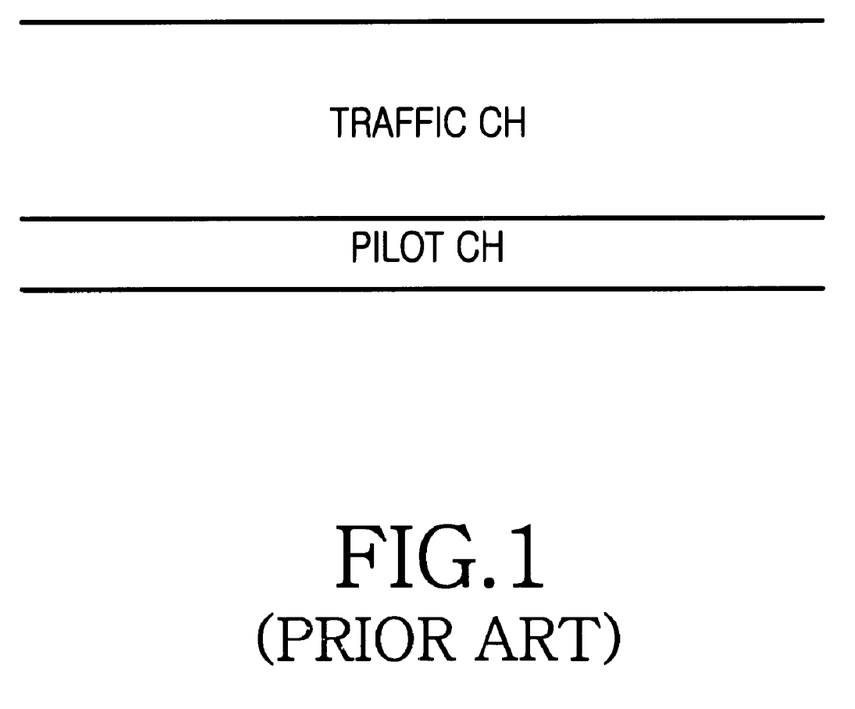
FIG. 1 is a diagram illustrating the total transmission power distribution for a reverse link between a mobile station and a base station in a conventional mobile communication system.

FIG. 1 illustrates signals transmitted over a reverse link in a mobile station for CDMA (Code Division Multiple Access) mobile communication systems. A pilot channel and a traffic channel are shown in the reverse link of FIG. 1. The pilot channel for the reverse link is transmitted at a constant transmission power. Although transmission power of the reverse pilot channel can be changed according to power control, there is rarely any variation in the ratio of the total transmission power to the pilot power.

A base station despreads a signal on a reverse link transmitted from a mobile station and thereafter, acquires a multipath component to assign a finger. At this point, the base station establishes a specific window to search signals for the window duration. However, in an IMT-2000 CDMA communication system having a wide bandwidth, since a receiver has a high time resolution, the window to be searched by a searcher increases in chip size. In addition, energy received over one path can decrease as the time resolution increases, as compared with a conventional narrow band communication system. Increasing the ratio of the total transmission power to the pilot power because of the increased bandwidth imposes a heavy burden on the searcher in performing the search process. Therefore, there is a limitation in reducing transmission power of the pilot channel.

When only a fundamental channel of 9600 bps is transmitted in a reverse link for the IMT-2000 CDMA communication system, 20–25% of the total transmission power of the mobile station is assigned to a pilot channel. Since this transmission power is not enough for the searcher in a base station to search the transmitted pilot channel, the searcher in the base station calculates a correlation value for a long integrating time to detect a multipath component. However, calculating the correlation value for a long integrating time causes an increase in the complexity of the hardware and increased power consumption. In addition, when the mobile station performs a handoff, a base station attempting connection to the mobile station should acquire a signal from the mobile station. However, since the signal strength or the signal on the pilot channel from the mobile station is too low, the base station will experience difficulty in acquiring the signal from the mobile station.

When the pilot signal transmitted over the reverse link has a low signal strength, the searcher of the base station should despread an input signal for a long time to detect the signal. Further, in order to rapidly acquire the signal with accuracy, the base station requires a searcher with a complicated hardware structure.

SUMMARY OF THE INVENTION

It is, therefore, an object of the present invention to provide a device and method for effectively acquiring a multipath component of a reverse link to assign a finger in a CDMA communication system.

It is another object of the present invention to provide a device and method for acquiring, at a base station, a signal transmitted from a mobile station and a multipath signal in a CDMA communication system.

It is a further object of the present invention to provide a device and method for accurately measuring transmission power or time delay of a reverse link signal transmitted from a mobile station in a CDMA mobile communication system.

It is still another object of the present invention to provide a device and method for decreasing pilot power in normal time and instead, increasing the pilot power for a predetermined short time at a mobile station, to increase the overall system capacity for a reverse link, in a CDMA communication system.

To achieve the above objects, a mobile station according to the present invention transmits a pilot signal, a common channel signal and a traffic channel signal for a reverse link. The mobile station normally transmits the common channel signal and the pilot signal at predetermined transmission power, and transmits the pilot signal at a transmission power higher than the predetermined transmission power for a predetermined duration.

Preferably, the pilot signal transmitted at the predetermined duration is spread with a first spreading code over the duration, where the pilot signal is transmitted at the predetermined transmission power, and is spread with a second spreading code over the duration where the pilot signal is transmitted at a transmission power higher than the predetermined transmission power.

Alternatively, the pilot signal transmitted over the predetermined duration is spread with a first spreading code over the duration where the pilot signal is transmitted at the predetermined transmission power, and is spread with at least two spreading codes including the first spreading code over the duration where the pilot signal is transmitted at the transmission power higher than the predetermined transmission power.

Preferably, the spreading code is an orthogonal code and the predetermined duration covers a boundary of data frames for the traffic channel signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail to avoid obscuring the invention in unnecessary detail.

In an exemplary embodiment of the present invention, for an effective search, a mobile station transmits a pilot channel for a reverse link at an increased transmission power for a predetermined time, and a base station despreads the pilot channel signal over the predetermined time duration and searches the transmission signal from the mobile station, to measure levels and time delays of multipath signals received from the mobile station and a relative delay among the paths. Further, a receiver in the base station performs finger assignment based on the measurement.

Figure 2:
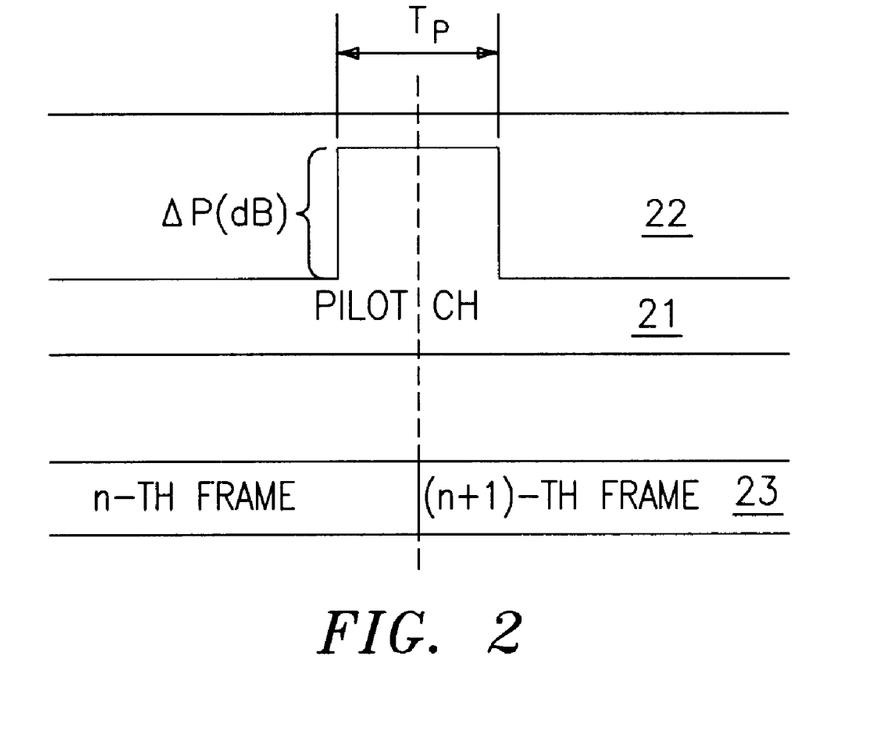
FIG. 2 is a diagram illustrating the total transmission power distribution for a reverse link in a mobile communication system according to an embodiment of the present invention.
Figure 3:
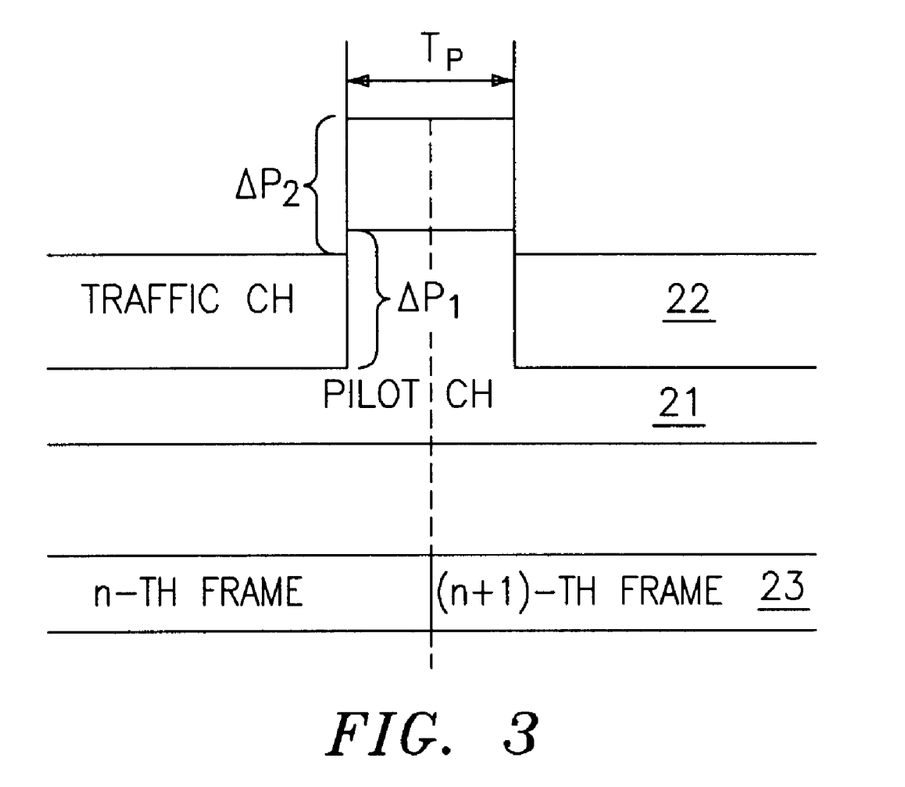
FIG. 3 is a diagram illustrating the while transmission power distribution for a reverse link in a mobile communication system according to another embodiment of the present invention.

FIGS. 2 and 3 illustrate the total transmission power distribution of reverse channels according to different embodiments of the present invention, wherein transmission power of a pilot signal is instantaneously increased, so as to enable a base station to acquire reverse link signals transmitted from multiple mobile stations. The reverse channels include a pilot channel, a reverse common channel and a reverse dedicated channel. A traffic channel represents the dedicated channel, which can be applied in the case where several channels, such as a fundamental channel, a supplemental channel, and a control channel are transmitted over a reverse link.

Referring first to FIG. 2, reference numeral 21 denotes transmission power of a reverse pilot channel, reference numeral 22 denotes the total transmission power of the other channels at the mobile station and reference numeral 23 denotes data frames. With regard to operation of a reverse link having the power distribution of FIG. 2, the mobile station increases transmission power of the pilot channel by $\Delta P$ over the normal transmission power, for a predetermined time duration Tp. In the embodiment of FIG. 2, the total transmission power of the mobile station is not changed, with some traffic channels decreasing in transmission power or not transmitted so that the remaining transmission power is assigned to the pilot channel. This allows the transmission power of the pilot channel transmitted from the mobile station to increase by $\Delta P$ over the normal transmission power during the short predetermined time duration Tp. At this point, it is also possible to assign the total transmission power of the mobile station to the pilot channel, for effective acquisition and finger assignment.

In the embodiment of FIG. 2, a case where a part of traffic channel frame data is not transmitted or is transmitted at a low transmission power during a time duration Tp. This is to illustrate that performance degradation caused by transmitting the traffic channels at a transmission power lower than the normal transmission power extends over two data frames to prevent the performance degradation from concentrating on one data frame. In addition, to secure uniform performance of the two data frames, the duration Tp is equally divided to be Tp/2 for the respective data frames. The base station, which has acquired synchronization, should know the time duration Tp and its location where the mobile station increases the transmission power of the pilot channel by various method of engage between base station and mobile station (i.e., negotiate or predetermine between base station and mobile station).

The time duration Tp where the base station increases the transmission power of the pilot channel and the increased transmission power $\Delta P$, depend on a data rate, the number of channels transmitted over the reverse link and a bandwidth for signal transmission. The longer the time duration Tp becomes, the higher the gain increases. Therefore, the mobile station can acquire a lower strength pilot signal. However, when the time duration Tp becomes too long, transmission power designated for the transmission data will instead be assigned to the pilot channel for a long time, thereby causing a decrease in the overall capacity of the system. Therefore, it is necessary to properly control the time duration Tp according to the system condition. For example, when the system has a chip rate of 3.6864 Mcps (chips per second), a frame length of 20 ms and the time duration Tp is comprised of 2048 chips, the time duration Tp is 0.56 ms.

In FIG. 2, since the time duration Tp is equally divided for the two data frames, each data frame has a duration 0.28 ms (=0.55 mm/2) where the transmission power of the pilot channel is increased to higher than the normal transmission power. The 0.28 ms duration is a very short duration which corresponds to 1.4% of the total 20 ms data frame, and performance degradation of the reverse link due to this short duration is negligible.

FIG. 3 illustrates another method for increasing transmission power of the pilot channel over the time duration Tp. In FIG. 3, reference numeral 21 denotes transmission power of a reverse pilot channel, reference numeral 22 denotes the total transmission power of the traffic channel at a mobile station and reference numeral 23 denotes data frames.

Referring to FIG. 3, a traffic channel is transmitted over the time duration Tp where the pilot channel increases in transmission power, and the total transmission power of the mobile station is increased to be higher by $\Delta P_2$ over the normal transmission power. In addition, the transmission power of the pilot channel is increased by $\Delta P_1$ over the same time duration Tp. Here, the increased total transmission power $\Delta P_2$ of the mobile station can be either equal to or different than the increased transmission power $\Delta P_1$ of the pilot channel. That is, the embodiment of FIG. 3 is characterized such that the total transmission power of the mobile station and the transmission power of the pilot channel increase simultaneously. In this manner, it is possible to increase transmission power of the pilot channel without reducing the traffic channel.

In an alternative method, transmission power of the pilot channel can be increased until equal to the total transmission power of the mobile station (i.e., (total transmission power= (total transmission power of the mobile station in normal time)+$\Delta P_2$). In this method, only the pilot channel is transmitted and the traffic channel is punctured (not transmitted).

In the embodiment of FIG. 3, the time duration Tp where the pilot channel increases in transmission power covers a boundary of two adjacent data frames, as in FIG. 2. Further, the base station should know the time duration Tp and its location where the mobile station increases the transmission power of the pilot channel. The time duration Tp can be designated by the system or can be set to have a sequence which repeats at predetermined periods. In the embodiment, it is assumed that the mobile station periodically increases transmission power of the pilot channel by $\Delta P_1$ at the boundary of data frames as shown in FIGS. 2 and 3, and the base station knows that the mobile station has increased transmission power of the pilot channel as stated above.

Since the base station knows the time when the mobile station will increase transmission power of the pilot channel, the base station despreads a reverse pilot channel transmitted from the mobile station with a spreading code, and then measures receiving power of the pilot channel. For this, a searcher in a base station can use a serial searcher or a matched filter. When the base station uses the serial searcher, complexity of hardware decreases, whereas the time duration Tp required becomes longer, causing a decrease in system capacity. On the contrary, when the base station uses the matched filter, although complexity of hardware increases, it is possible to reduce time duration Tp, thus contributing to an increase in the system capacity.

In addition, a receiver in the base station can store a received Tp duration signal on the reverse link transmitted from the mobile station in a memory before despreading. This method can reduce the time duration Tp without increasing complexity of the receiver. The receiver structure of the base station will be described later.

When the pilot channel has a low signal level, the receiver should integrate a received signal for the longer time in order to measure a level of the received pilot channel. However, this causes degradation in performance of finger assignment. To prevent the performance degradation, the base station need a receiver with more complex hardware and consumes increased power. However, when the mobile station increases transmission power of the reverse link pilot channel according to the present invention, the base station receiver can perform fast signal acquisition for the reverse link with simpler hardware.

In a mobile communication system, an increase in bandwidth causes an increase in multipath resolution capability for a received signal, which means reduction in received energy per path. In this case, a rake receiver has an improved capability of searching and demodulating the increased number of paths. However, it is necessary to calculate a correlation value over a long time period in order to acquire a multipath signal lower in strength than a given threshold and assign it to a finger. This may cause an increase in power consumption and complexity of the receiver. The present invention aims to effectively assign a finger by calculating a correlation value over a relatively short time period and detecting a multipath signal on a low level.

For a CDMA communication system, a method for storing some received signals in a memory to process the stored signals later is proposed. This method has been proposed to measure levels of received signals for hard handoff between frequencies. That is, in accordance with the method proposed in the present invention, a mobile station increases transmission power of a reverse pilot channel for a specific duration, and a base station receiver stores the pilot channel signal transmitted at the increased transmission power in a memory. In this case, since the base station receiver can reduce the number of samples for the received signal when storing the received signal, it is possible to simplify the hardware of the base station and reduce the time required to calculate the correlation value, thereby decreasing complexity of the base station.

In addition, during a handoff between base stations, there may be a case where a base station initiating communication with a new mobile station fails to receive a pilot signal with enough strength to acquire a signal from the mobile station. To prevent this problem, in the present invention, transmission power of the pilot channel is increased for a predetermined time so as to facilitate signal acquisition at the base station.

Although several results obtained by increasing the transmission power of the pilot channel for a predetermined time have been described with reference to FIGS. 2 and 3, these methods can be applied to other structures proposed hereafter.

Figure 4:
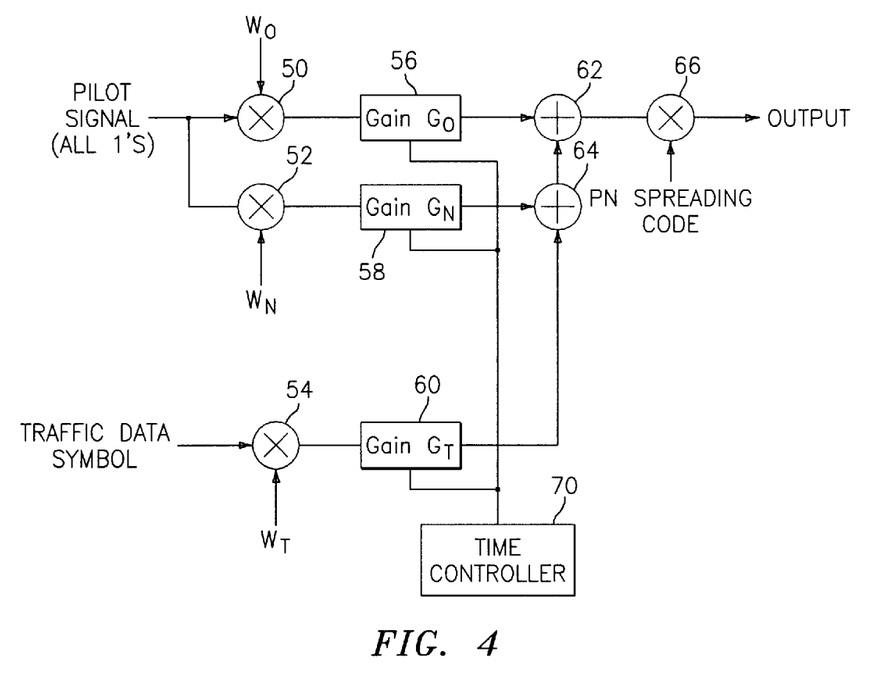
FIG. 4 is a diagram illustrating a mobile station transmitter in a mobile communication system according to an embodiment of the present invention.

FIG. 4 illustrates a transmitter in a mobile station, which increases transmission power of a reverse pilot channel for a predetermined time duration Tp. Here, the pilot channel can increase transmission power of the reverse pilot channel using either a single spreading code or plural spreading codes. When transmission power of the pilot channel is increased using a single spreading code, a pilot channel transmitter for a mobile station can adjust transmission power of the pilot channel to a desired level by controlling a gain of a gain controller. FIG. 4 shows a method of dividing transmission power for a base station in the case where transmission power of the pilot channel is divided with plural spreading codes when a mobile station increases transmission power of the reverse pilot channel for a predetermined time Tp. In this embodiment, it is assumed that transmission power of the pilot channel is increased using plural spreading codes as shown in FIG. 4. Here, the spreading code is assumed to be an orthogonal code.

A mobile station transmitter of FIG. 4 not only increases transmission power of the pilot channel but also transmits plural code channels which are spread with different spreading codes at the increased transmission power, for the time duration Tp. In FIG. 4, two orthogonal codes $W_0$ and $W_N$ are used for the spreading codes, by way of example. In the embodiment, it is assumed that the reverse pilot channel signal is spread with the orthogonal code $W_0$ in normal time and is additionally spread with the orthogonal code $W_N$ over the time duration Tp shown in FIGS. 2 and 3. In this case, an increment ($\Delta P$) of transmission power of the reverse pilot channel can be generated by the orthogonal code $W_N$ in FIGS. 2 and 3. In this embodiment, the mobile station transmitter spreads and transmits the reverse pilot channel using two spreading codes, by way of example.

The pilot channel can be applied not only to FIGS. 2 and 3 but also to other structure stated above. Of course, it is also possible to simply increase the all channel transmission power without transmitting the additional pilot channel spread with spreading code Wn. In the embodiment, to prevent an influence on a channel estimator and a time tracking loop of a finger, transmission power used for a pilot channel (hereinafter, referred to as a first pilot channel) spread with the orthogonal code $W_0$ is equally assigned during both the Tp duration and the normal duration, and a pilot channel (hereinafter, referred to as a second pilot channel) spread with the orthogonal code $W_N$ is activated for the Tp duration. Therefore, the total transmission power of the pilot channel transmitted from the mobile station is increased by $\Delta P$.

When transmission power of the pilot channel is divided by two different spreading codes, a pilot channel signal P(t) can be expressed as $$P(t)=G0*C0(t)+GN*CN(t) \quad \text{Equation 1}$$

where G0 and GN represent gains of the respective code channels, and C0(t) and CN(t) represent spreading codes for the respective pilot code channels. In Equation 1, it is assumed that the pilot signal is transmitted over two difference code channels, and the gains G0 and GN of the respective channels can be expressed as a complex number. In addition, orthogonal codes can be used for the spreading codes C0(t) and CN(t) for the respective code channels.

Referring to FIG. 4, a mobile station transmitter for distributing a pilot channel to two spreading codes over the time duration Tp to transmit the pilot channel is shown, according to an embodiment of the present invention. A time controller 70 outputs control signals for controlling gain controllers 56 and 58 which controls gains of associated channel transmitters. In this embodiment, the time controller 70 generates a gain control signal for driving the gain controller 58 during the time duration Tp to increase the total transmission power of the pilot channels. Therefore, the time controller 70 generates a gain control signal for controlling the gain controller 56 such that a signal on the first pilot channel is transmitted with constant transmission power at every duration including the time duration Tp, and generates a gain control signal for controlling the gain controller 58 such that a signal on the second pilot channel is transmitted with the increased transmission power ΔP. Further, in the mobile station supporting the power distribution of FIG. 2, the time controller 70 generates a gain control signal for controlling a gain controller 60 such that transmission of a traffic channel signal is discontinued at the time duration Tp. In contrast, in the mobile station supporting the power distribution of FIG. 3, the time controller 70 generates a gain control signal for controlling the gain controller 60 such that transmission of a traffic channel signal is continued at the time duration Tp.

A multiplier 50 multiplies a pilot channel signal comprised of all '1's by an orthogonal code W0 to orthogonally spread the pilot channel signal into a first pilot channel signal. The gain controller 56 controls a gain of the first pilot channel signal output from the multiplier 50, under the control of the time controller 70. The first pilot channel output from the gain controller 56 becomes the normally transmitted reverse pilot channel. An adder 62 adds the first pilot channel signal output from the gain controller 56 and an other channel signal from adder 64. A multiplier 52 multiplies the pilot channel signal comprised of all '1's by an orthogonal code WN to orthogonally spread the pilot channel signal into a second pilot channel signal. The gain controller 58 controls a gain of the second pilot channel signal output from the multiplier 52 for the time duration Tp, under the control of the time controller 70. The second pilot channel output from the gain controller 58 becomes the reverse pilot channel, transmission power of which is increased at the time duration Tp. An adder 64 adds the second pilot channel signal output from the gain controller 58 and a channel signal from gain controller 60.

A multiplier 54 multiplies data symbols on the traffic channel by an orthogonal code WT assigned to the traffic channel to orthogonally spread the traffic channel symbols. A gain controller 60 controls a gain of the spread traffic channel output from the multiplier 54, under the control of the time controller 70. The adder 64 adds the traffic channel signal and the second pilot channel signal. A multiplier 66 multiplies channel signals of the mobile station transmitter, added in the adders 62 and 64, by a PN code to spread the channel signals. Here, the traffic channel can be comprised of plural channels. In addition, it is to be understood that the mobile station transmitter may include other reverse channels.

In FIG. 4, the pilot channel signal is spread with two orthogonal codes W0 and WN. Thereafter, the pilot channel signals spread with the orthogonal codes are multiplied by different gains, and then spread with a common PN spreading code. In FIG. 4, a mobile station transmitter which includes a pilot channel transmitter for transmitting the pilot channel with two different orthogonal codes is shown along with a traffic channel transmitter for transmitting the traffic channel. Further, although FIG. 4 shows only one traffic channel, the base station transmitter can transmit other channels such as a dedicated control channel, a fundamental channel and a supplemental channel.

At a designated time, the time controller 70 controls gains of the respective channels. In the cases of FIGS. 2 and 3 where transmission power of the pilot channel is instantaneously increased, the time controller 70 controls, at the time Tp, gains of the respective channels to transmit the pilot channel at a transmission power higher than the normal transmission power. In FIG. 4, although the invention has been described with reference to an embodiment of a base station transmitter for increasing transmission power of the pilot channel for the predetermined time duration Tp, the base station transmitter can be applied to any structure by properly adjusting gains of the respective channels.

As described above, the mobile station changes transmission power of a pilot signal for the predetermined time Tp so as to increase a level of the pilot channel signal received at the base station, thereby assisting the base station in acquiring a signal transmitted from the mobile station.

In the above embodiments, the base station despreads the received signals for the time duration Tp to receive signals transmitted from the mobile station and measure levels of the received signals, propagation delay and relative propagation delay between multipaths. The base station receiver can use a serial searcher, which is widely used in the despreading and searching process. However, use of the serial searcher inevitably increases the time duration Tp. A searcher for a receiver, having the reduced time duration Tp, can be implemented in the following methods, to perform despreading and searching.

In a first method, a matched filter is used for the searcher. The matched filter can rapidly calculate a correlation between a received signal and a locally generated spreading code. However, the matched filter is disadvantageous in that it increases complexity of a receiver and power consumption.

In a second method, a signal received at around the time duration Tp is stored in a memory to calculate a correlation between the signal and a locally generated spreading code. Though a memory for storing the received signal is required, this method has a simple despreading process and reduced power consumption.

In an exemplary embodiment of the present invention, the searcher is implemented in the second method stated above.

Figure 5:
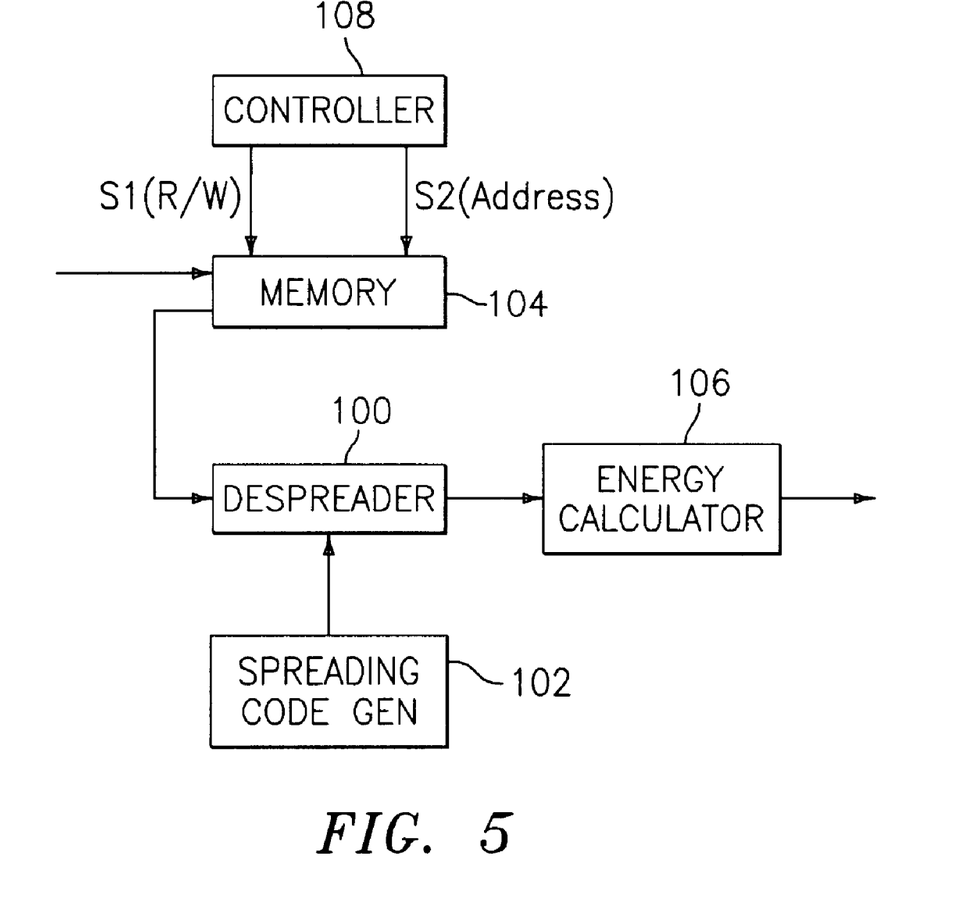
FIG. 5 is a diagram illustrating a searcher for a base station receiver in a mobile communication system according to an embodiment of the present invention.

FIG. 5 shows a searcher according to an embodiment of the present invention. Referring to FIG. 5, the searcher according to the present invention includes a despreader 100, a spreading code generator 102, a memory 104 for storing received signals, an energy calculator 106 and a controller 108. The memory 104, under the control of the controller 108, stores signals received at the time duration Tp. The controller 108 applies a read/write control signal S1 to the memory 104 to enable the memory 104 to store input signals at the time duration Tp, and applies an address control signal S2 for designating an address of the memory 104, where the input signals are to be stored. Upon every receipt of the input signal at the time duration Tp, the controller 108 increases the address of the memory 104 by generating the address control signal S2 to store the input signal at the new address of the memory 104. After storage of the input signal in the memory 104, the controller 108 outputs the signals stored in the memory 104 to the despreader 100 by generating the read/write control signal S1 and the address control signal S2.

The spreading code generator 102 generates a local spreading code which is identical to a spreading code used in a transmitter of a base station, and provides the generated spreading code to the despreader 100. The despreader 100 multiplies the received signal read from the memory 104 by the local spreading code generated from the spreading code generator 102 and integrates the multiplied signal over a predetermined duration. The spreading code generator 102 locally generates the orthogonal code which is identical to the orthogonal code used in the transmitter of a base station. The energy calculator 106 calculates the energy of the despread signal. To calculate the energy of the despread signal, the energy calculator 106 calculates the sum of the despread signals for I and Q arms (i.e., $I^2+Q^2$). This value is Ec/Io of a received pilot channel, where Ec represents energy per chip of the received pilot channel signal and Io represents a power spectral density of the received total CDMA signal.

Figure 6:
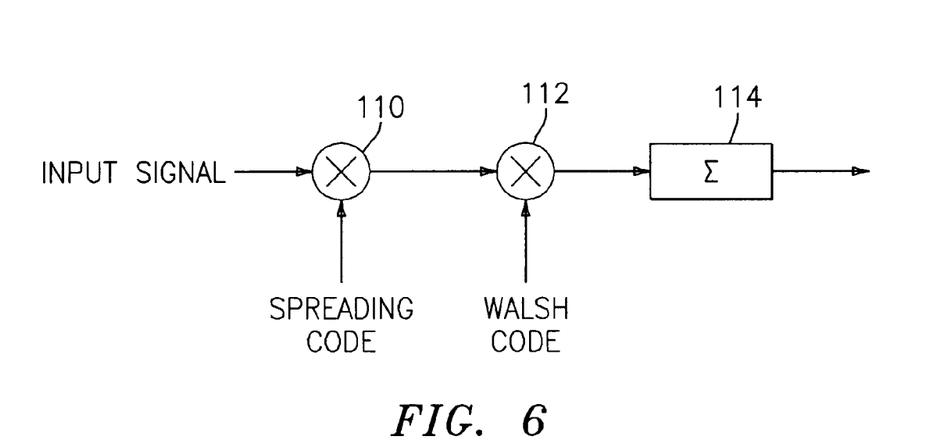
FIG. 6 is a diagram illustrating a scheme for despreading a reverse pilot channel with a single orthogonal code in the searcher of FIG. 5 according to an embodiment of the present invention.

FIG. 6 illustrates the despreader 100 in the searcher of FIG. 5, in which all the signals are complex signals. FIG. 5 shows a despreader for a base station receiver which receives a pilot channel signal which was spread in the mobile station with a single spreading code while increasing transmission power of the reverse pilot channel at a time duration Tp.

Referring to FIG. 6, a multiplier 110 multiplies an input signal by a PN spreading code to despread the input signal. A multiplier 112 multiplies the despread signal output from the multiplier 110 by an associated orthogonal code to orthogonally modulate the despread signal. An accumulator 114 accumulates the output of the multiplier 112 on a symbol unit basis.

Figure 7:
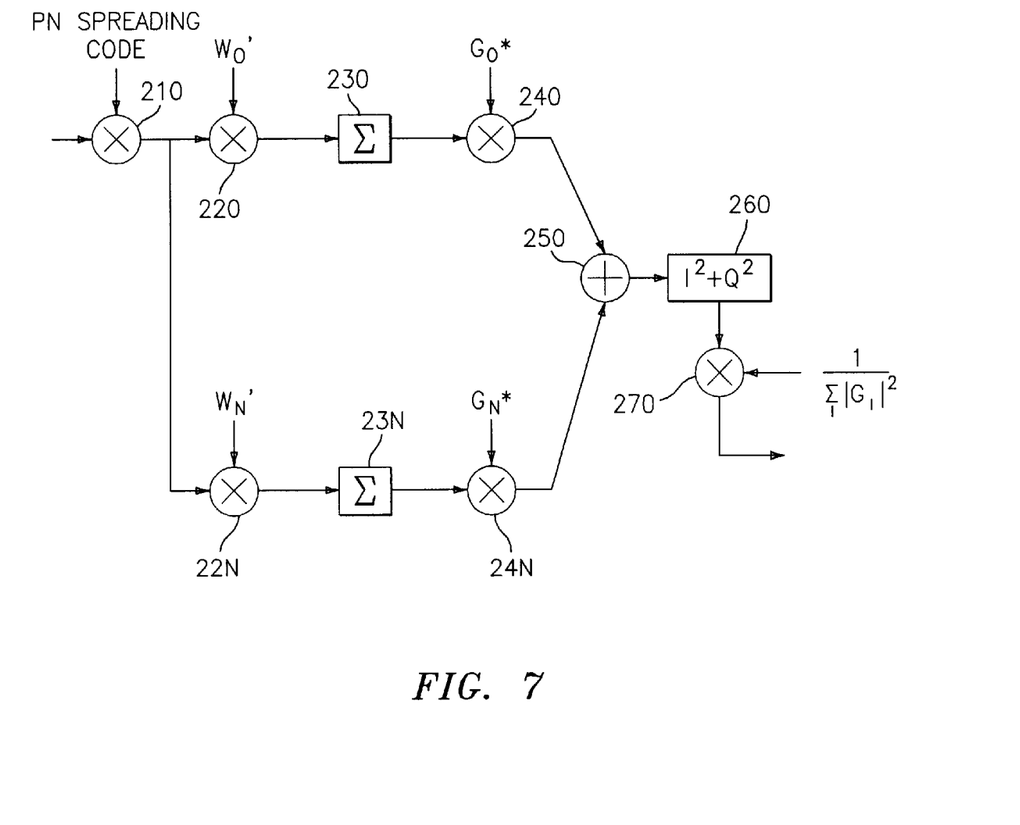
FIG. 7 is a diagram illustrating a scheme for despreading a reverse pilot channel with multiple orthogonal codes in the searcher of FIG. 5 according to a first embodiment of the present invention.

FIG. 7 illustrates a despreader for a base station receiver according to the present invention, which despreads the pilot channel signal spread with plural spreading codes. The despreader of FIG. 7 despreads a pilot channel signal which was spread in the mobile station with plural spreading codes. In FIG. 7, all the signals are complex signals.

Referring to FIG. 7, a multiplier 210 multiplies a received signal by a PN spreading code to despread the received signal. Multipliers 220 and 22N multiply the despread signal output from the multiplier 210 by associated orthogonal codes $W_0'$ and $W_N'$ to perform orthogonal demodulation for the despread signal. Accumulators 230 and 23N accumulate outputs of the associated multipliers 220 and 22N on a symbol unit basis. Multipliers 240 and 24N multiply outputs of the associated accumulators 230 and 23N by associated complex gains $G_0^*$ and $G_N^*$ for phase compensation. An adder 250 adds outputs of the multipliers 240 and 24N, and a squarer 260 squares an output of the adder 250 to convert the output of the adder 250 to an energy value. A multiplier 270 multiplies the energy value by $$\frac{1}{\sum_i |G_i|^2}$$

to normalize the output of the squarer 260.

As illustrated in FIG. 7, the input signal is multiplied by the PN spreading code at the multiplier 210 to be despread, and the despread signal is multiplied by the corresponding orthogonal codes at the multipliers 220 and 22N to be orthogonally demodulated. The signals output from the multipliers 220 and 22N are accumulated at the associated accumulators 230 and 23N on a symbol unit basis. Further, the multipliers 240 and 24N multiply the outputs of the accumulators 230 and 23N by associated gains $G_0^*$ and $G_N^*$, respectively, to compensate phase components of the complex gains multiplied by the respective orthogonal channels. The phase compensated signals are combined by the adder 250. The squarer 260 converts the combined signal output from the adder 250 to an energy value. The multiplier 270 multiplies the energy value by $$\frac{1}{\sum_i |G_i|^2}$$

to normalize the output of the squarer 260. That is, the multiplicand for gain compensation is a reciprocal of the sum of the squared complex gain Gi (i=0,1,2, . . . ,n). Here, the multiplier 270 is used to obtain a good gain compensation, and is optional.

The despreader of FIG. 7 despreads the received signal, accumulates the despread signal on a symbol unit basis and then calculates the energy of the accumulated signal.

In the despreader of FIG. 7, plural despreading elements despread the received signal in parallel. However, the receiver can despread only a part of the plural orthogonal codes transmitted from the base station. That is, the receiver can perform despreading for a part of or all of the orthogonal codes assigned to the pilot channels shown in FIG. 7.

Figure 8:
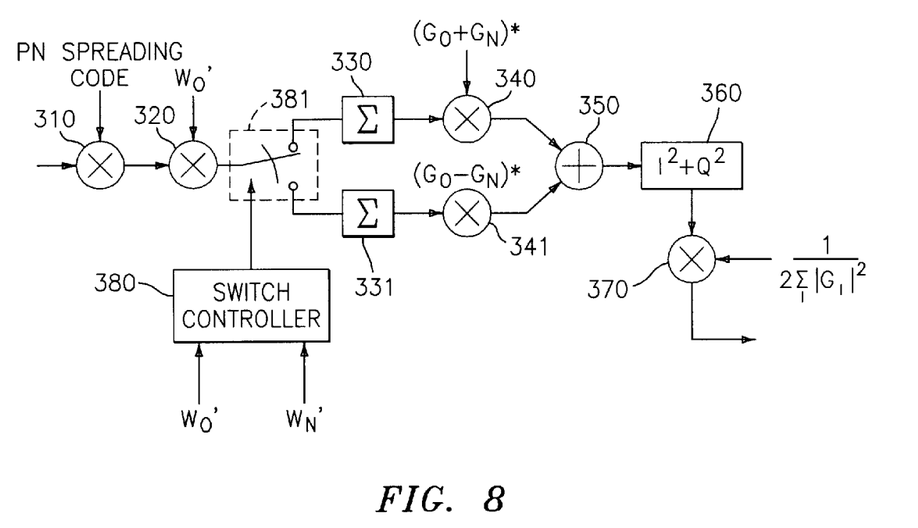
FIG. 8 is a diagram illustrating a scheme for despreading a reverse pilot channel with multiple orthogonal codes in the searcher of FIG. 5 according to a second embodiment of the present invention.

FIG. 8 illustrates a despreader for a base station receiver according to another embodiment of the present invention, which receives a pilot channel that a transmitter of a mobile station has spread using a plurality of orthogonal codes. A despreading method according to the second embodiment aims to reduce power consumption by grouping input signals having the same spreading code, unlike the embodiment of FIG. 7 wherein input signals are simultaneously despread with plural spreading codes. Although FIG. 8 shows a case where two orthogonal codes are used, this structure can be applied even to a despreader which uses three or more orthogonal codes. In FIG. 8, all the signals are complex signals.

Referring to FIG. 8, a multiplier 310 multiplies an input signal by a PN spreading code to despread the input signal. A multiplier 320 multiplies an output of the multiplier 310 by an orthogonal code to generate an orthogonally demodulated output signal. Here, the orthogonal code applied to the multiplier 320 is assumed to be an orthogonal code $W_0'$. A switch controller 380 receiving orthogonal codes $W_0'$ and $W_1'$, searches the two orthogonal codes on a chip unit basis, to generate a control signal for selecting a first path when $W_0'(i)=W_1'(i)$, and generate a control signal for selecting a second path when $W_0'(i) \neq W_1'(i)$. The orthogonal code $W_0'(i)$ represents an i-th chip of the orthogonal code $W_0'$ and the orthogonal code $W_1'(i)$ represents an i-th chip of the orthogonal code $W_1'$. A switch 381 has an input node connected to the multiplier 320, a first output node connected to the first path and a second output node connected to the second path. The switch 381 switches the output of the multiplier 320 to the first path or the second path according to an output of the switch controller 380.

An accumulator 330 connected to the first path, accumulates input signals on a symbol unit basis. A multiplier 340 multiplies an output of the accumulator 330 by a complex gain $(G_0+G_1)^*$ to compensate a phase gain of the signal output through the first path. The signals switched to the first path are the chips since the orthogonal codes having the same sign. An accumulator 331 connected to the second path, accumulates input signals on a symbol unit basis. A multiplier 341 multiplies an output of the accumulator 331 by a complex gain $(G_0-G_1)^*$ to compensate a phase gain of the signal output through the second path. The signals switched to the second path are the chips, for the orthogonal code having different signs. An adder 350 combines outputs of the multipliers 340 and 341, and a squarer 360 squares an output of the adder 350 to convert it to an energy value. A multiplier 770 multiplies the energy value by a complex gain $$\frac{1}{2\sum_i |G_i|^2}$$

to normalize the output of the squarer 360.

First, an operation of the despreader shown in FIG. 8 will be described theoretically. Herein, it is assumed that the orthogonal code $W_0$ and $W_1$ used in FIG. 8 have a length of 8 chips (i=8). Further, it is assumed that the orthogonal code $W_0'$ has a pattern of +1,+1,+1,+1,−1,−1,−1,−1, and the orthogonal code $W_1'$ has a pattern of +1,+1,−1,−1,+1,+1,−1,−1. Then, the orthogonal codes $W_0'$ and $W_1'$ can be expressed as.

TABLE 1

| Orthogonal Code | Chip Number | | | | | | | |
|---|---|---|---|---|---|---|---|---|
| | i1 | i2 | i3 | i4 | i5 | i6 | i7 | i8 |
| $W_0'$ | +1 | +1 | +1 | +1 | −1 | −1 | −1 | −1 |
| $W_1'$ | +1 | +1 | −1 | −1 | +1 | +1 | −1 | −1 |

Further, when the input signals of the despreader are r1, r2, r3, r4, r5, r6, r7 and r8, and the gains G0 and G1 multiplied by the respective orthogonal codes are real numbers, the signals despread with the spreading code $W_0'$ in the receiver having the structure of FIG. 8 can be expressed as $Y0=G0^*(r1+r2+r3+r4-r5-r6-r7-r8)$ $Y1=G1^*(r1+r2-r3-r4+r5+r6-r7-r8)$ A final output of the despreader becomes Y0+Y1.

The orthogonal codes $W_0'$ and $W_1'$ have the same chip components at first, second, seventh and eighth locations, and have different chip components at third, fourth, fifth and sixth locations. Components of the final output, Y0+Y1, of the despreader are classified according to whether the corresponding chip components of the orthogonal codes $W_0'$ and $W_1'$ are identical or different, as follows:

$X0=(G0^*+G1^*)(r1+r2-r7-r8)$ $X1=(G0^*-G1^*)(r3+r4-r5-r6)$

Here, X0+X1=Y0+Y1. As shown in the above formulas, by classifying the input signals according to the combination of the chip components of the respective orthogonal codes, it is possible to reduce additions performed during despreading. Though ineffective against a shorter orthogonal code, this is highly effective against a longer orthogonal code.

FIG. 8 shows a hardware structure for the above description. In FIG. 8, the input signals are multiplied by the PN spreading code at the multiplier 310 and then multiplied by the orthogonal code W0 at the multiplier 320. The switch controller 380 compares two orthogonal codes to determine whether the corresponding components thereof are identical to each other, and generates a switching control signal according to the comparison results. The switch 381 switches the output of the multiplier 320 to the accumulators 330 and 340 according to the switching control signal. When the chip components of the two orthogonal codes W0' and W1' are identical, the output signal of the multiplier 320 is input to the accumulator 330 located in the first path. Otherwise, when the chip components are different, the output signal of the multiplier 320 is input to the accumulator 331 located in the second path. In addition, the divided signals are accumulated at the corresponding accumulators 330 and 331 on the symbol unit basis. Thereafter, the multiplier 340 multiplies the output of the accumulator 330 by the gain $G0^*+G1^*$, and the multiplier 341 multiplies the output of the accumulator 331 by the gain $G0^*-G1^*$. The adder 350 adds the outputs of the multipliers 340 and 341. The output of the adder 350 is squared by the squarer 360 to be converted to an energy value. The multiplier 370 multiplies the output of the squarer 360 by $$\frac{1}{2\sum_i |G_i|^2}$$

to normalize the outputs of the multipliers 340 and 341.

In the case where the pilot signal is transmitted with several spreading codes in the above receiver structure, the mobile station needs to know the ratio of the transmission powers assigned to the respective orthogonal codes or gain values for the respective orthogonal codes. This can be predetermined in a standardizing process, or the base station can transmit this to the mobile station using a system parameter. In addition, the receiver can measure this using a simple algorithm. Alternatively, this can also be estimated by calculating an energy ratio of despread signals for the respective orthogonal codes.

Figure 9:
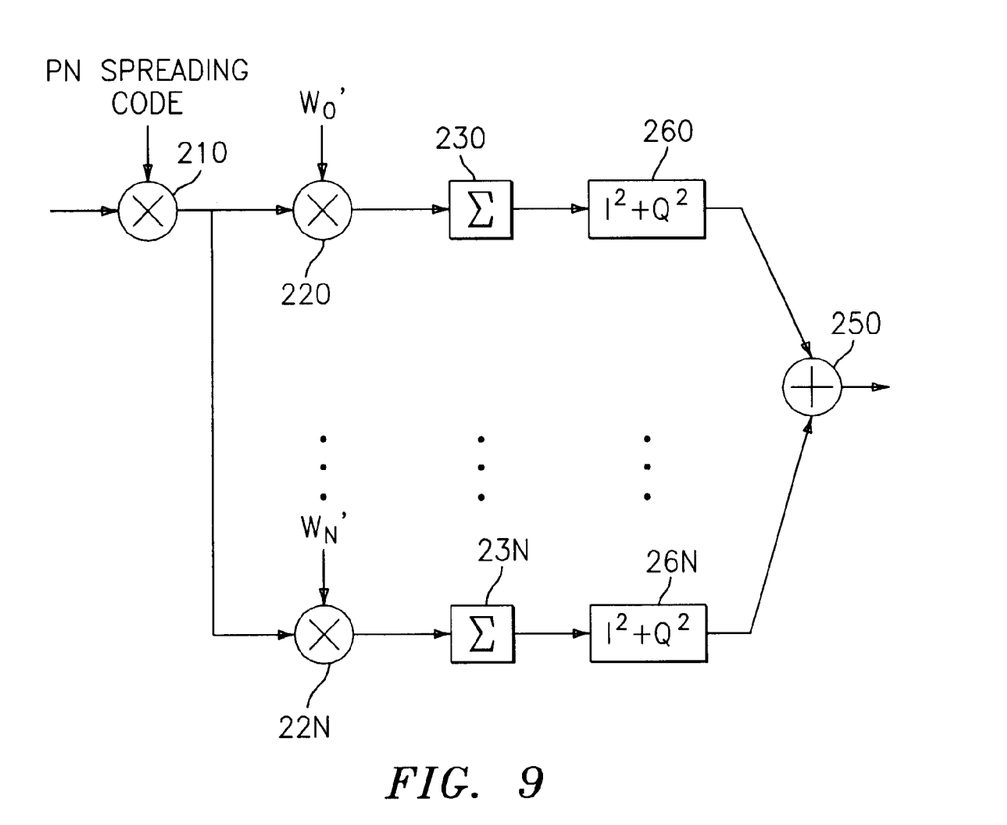
FIG. 9 is a diagram illustrating a scheme for despreading a reverse pilot channel with multiple orthogonal codes in the searcher of FIG. 5 according to a third embodiment of the present invention.

FIG. 9 illustrates a despreader of a receiver according to a further embodiment of the present invention, in the case where the pilot signal is spread with plural spreading codes as show in FIGS. 7 and 8. In FIG. 9, the pilot channel of the base station is spread with plural orthogonal codes W0' to WN' and then, spread with a common PN spreading code. In FIG. 9, all the signals are complex signals.

Referring to FIG. 9, a multiplier 210 multiplies a received signal by a PN spreading signal to despread the received signal. Multipliers 220 and 22N multiply the despread signal output from the multiplier 210 by associated orthogonal codes W0' and WN' to orthogonally demodulate the despread signal. Accumulators 230 and 23N accumulate outputs of the associated multipliers 220 and 22N on the symbol unit basis. Squarers 260 and 26N square outputs of the associated accumulators 230 and 23N to convert them to energy values. An adder 250 combines outputs of the squarers 260 and 26N.

The despreader of FIG. 9 despreads the received signal, accumulates the despread signal on the symbol unit basis to calculate energy values, and then combines the calculated energy values. Unlike the other despreaders, the despreader and the energy calculator of FIG. 9 separately calculate energies of the respective channel and combines the calculated energies. The despreaders of FIGS. 7 and 8 coherently add the despread values of the respective channels, whereas the despreader of FIG. 9 first calculates the energies of the respective channels and then adds the calculated energies. The despreader of FIG. 9 undergoes more performance degradation as compared with the despreaders of FIGS. 7 and 8. However, the despreader of FIG. 9 is advantageous in that it can calculate a power ratio of the pilot channels received from the respective base stations, even knowing the gains of the respective channels. In summary, a mobile station can acquire signals from a base station with reduced power consumption and reduced hardware complexity, and can accurately measure power and time delay of a signal received over a reverse link. In addition, a base station receiver for a spread spectrum communication system detects a multipath signal to perform finger assignment, thereby increasing performance of a rake receiver. Further, the base station receiver can store received signals in a memory with reduced memory capacity and reduced power consumption. Moreover, it is possible to increase the overall system capacity by decreasing pilot power in normal time and instead increasing the pilot power for a predetermined time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal transmission method for a mobile station in a code division multiple access (CDMA) communication system, wherein the mobile station transmits a pilot signal and a traffic channel signal for a reverse link, the method comprising the steps of:
    transmitting the pilot signal at a predetermined transmission power; and
    transmitting the pilot signal at a transmission power higher than said predetermined transmission power over a predetermined duration.

2. The signal transmission method as claimed in claim 1, wherein the pilot signal transmitted over the predetermined duration is spread with a first spreading code over the duration where the pilot signal is transmitted at the predetermined transmission power, and is spread with a second spreading code over the duration where the pilot signal is transmitted at the transmission power higher than the predetermined transmission power.

3. The signal transmission method as claimed in claim 1, wherein the pilot signal transmitted over the predetermined duration is spread with a first spreading code over the duration where the pilot signal is transmitted at the predetermined transmission power, and is spread with at least two spreading codes including the first spreading code over the duration where the pilot signal is transmitted at the transmission power higher than the predetermined transmission power.

4. The signal transmission method as claimed in claim 2, wherein the spreading code is an orthogonal code.

5. The signal transmission method as claimed in claim 1, wherein the predetermined duration covers a boundary of two data frames for the traffic channel signal.

6. A device for transmitting reverse link channel signals for a mobile station in a CDMA communication system, comprising:
    a traffic channel transmitter for transmitting a traffic channel signal; and
    a pilot channel transmitter for transmitting a reverse pilot channel signal at the predetermined transmission power and transmitting the reverse pilot channel signal at a transmission power higher than the predetermined transmission power over a predetermined duration.

7. The device as claimed in claim 6, wherein the pilot channel transmitter comprises:
    a spreader for spreading the reverse pilot signal with a spreading code assigned to the pilot channel; and
    a gain controller for gain controlling the spread reverse pilot signal to a predetermined power level over the duration where the reverse pilot signal is transmitted at the predetermined transmission power, and gain controlling the spread reverse pilot signal to a power level higher than the predetermined power level over the duration where the reverse pilot signal is transmitted at the transmission power higher than the predetermined transmission power.

8. The device as claimed in claim 6, wherein the pilot channel transmitter comprises:
    a first spreader for spreading the reverse pilot signal with a first spreading code assigned to the pilot channel;
    a second spreader for spreading the reverse pilot signal with at least one second spreading code assigned to the pilot channel; and
    a gain controller for controlling the reverse pilot signal spread with the first spreading code over the duration where the reverse pilot signal is transmitted at the predetermined transmission power, and controlling the reverse pilot signal spread with the second spreading code over the duration where the reverse pilot signal is transmitted at the transmission power higher than the predetermined transmission power.

9. The device as claimed in claim 7, wherein the spreading code is a Walsh orthogonal code.

10. The signal transmission method as claimed in claim 6, wherein the predetermined duration covers a boundary of two data frames for the traffic channel signal.

11. A device for receiving channel signals for a base station in a CDMA communication system, wherein a mobile station spreads a reverse common channel signal and a pilot signal with a first spreading code assigned to a pilot channel to transmit the spread signal at a predetermined transmission power, and spreads the reverse pilot signal with at least two spreading codes including the first spreading code to transmit the spread reverse pilot signal at a transmission power higher than the predetermined transmission power over a predetermined duration, the device comprising:
    a memory for storing the pilot signal received over the predetermined duration;
    a despreader for despreading the stored pilot signal with a spreading code assigned to the pilot channel; and
    an energy calculator for detecting a power level of the despread pilot signal.

12. The device as claimed in claim 11, wherein the despreader comprises:
    a PN (Pseudo Noise) despreader for despreading the stored pilot signal with a PN sequence;
    a first channel despreader for despreading the PN despread pilot signal with the first spreading code;

a second channel despreader for despreading the PN despread pilot signal with the second spreading code; and an accumulator for accumulating and gain controlling the pilot signals despread with the first and second spreading codes and adding the gain controlled pilot signals to detect pilot signals.

13. A method for receiving channel signals for a base station in a CDMA communication system, in which a mobile station spreads a reverse common channel signal and a pilot signal with a first spreading code assigned to a pilot channel to transmit the spread signals at a predetermined transmission power, and spreads the reverse pilot signal with at least two spreading codes including the first spreading code to transmit the spread reverse pilot signal at a transmission power higher than the predetermined transmission power over a predetermined duration, the method comprising the steps of:

storing the pilot signal received over the predetermined duration;

despreading the stored pilot signal with a spreading code assigned to the pilot channel; and detecting a power level of the despread pilot signal.

14. The method as claimed in claim 13, wherein the despreading step comprises the steps of:

despreading the stored pilot signal with a PN sequence;

despreading the PN despread pilot signal with the first spreading code;

despreading the PN despread pilot signal with the second spreading code; and accumulating and gain controlling the pilot signals despread with the first and second spreading codes and adding the gain controlled pilot signals to detect pilot signals.

15. The signal transmission method as claimed in claim 3, wherein the spreading code is an orthogonal code.

16. The device as claimed in claim 8, wherein the spreading code is a Walsh orthogonal code.

* * * * *